United States Patent
Obahi et al.

(10) Patent No.: US 6,764,107 B1
(45) Date of Patent: Jul. 20, 2004

(54) SELF-SEALING PRE-ASSEMBLED ENDFITTING/COUPLING FOR CORRUGATED TUBING

(76) Inventors: Hassan Obahi, 172 High Meadow Dr., West Springfield, MA (US) 01089; John J. Pavlovich, 61 E. Gooseberry Rd., West Springfield, MA (US) 01089

( * ) Notice: Subject to any disclaimer, the term of this patent is extended or adjusted under 35 U.S.C. 154(b) by 0 days.

(21) Appl. No.: 10/431,555

(22) Filed: May 8, 2003

Related U.S. Application Data

(60) Provisional application No. 60/378,807, filed on May 8, 2002.

(51) Int. Cl.[7] ............................................. F16L 21/06
(52) U.S. Cl. ...................... 285/322; 285/34; 285/308; 285/382.7; 285/903
(58) Field of Search ...................... 285/34, 243, 245, 285/257, 308, 309, 319, 322, 324, 382.7, 903

(56) References Cited

U.S. PATENT DOCUMENTS

| | | | | |
|---|---|---|---|---|
| 2,280,892 A | * | 4/1942 | Irving | 285/243 |
| 3,222,091 A | * | 12/1965 | Marshall | 285/243 |
| 4,666,192 A | * | 5/1987 | Zamora | 285/322 |
| 5,261,707 A | * | 11/1993 | Kotake et al. | 285/308 |
| 5,441,312 A | | 8/1995 | Fujiyoshi et al. | |
| 6,036,237 A | | 3/2000 | Sweeney | |

FOREIGN PATENT DOCUMENTS

| | | | | |
|---|---|---|---|---|
| CA | 565954 | * | 11/1958 | 285/243 |
| GB | 345746 | * | 4/1931 | 285/322 |

* cited by examiner

*Primary Examiner*—Lynne H. Browne
*Assistant Examiner*—Aaron Dunwoody
(74) *Attorney, Agent, or Firm*—Deborah A. Basile

(57) ABSTRACT

The present invention is a pre-assembled fitting or coupling having a body, a sleeve, and a nut. One end of the nut has a through bore that is tapered and decreases in diameter toward the end of the nut. The outer surface of the sleeve is tapered as well which facilitates the radial movement of the sleeve segments upon tightening locking the sleeve segments into the proper position on the corrugated tubing. The body contains an inner seal surface with improved geometry that effectively concentrates the sealing load over a predetermined surface and prevents overloading of the seal surface area. The sleeve of the present invention is divided into four separate segments. The inner surface of the sleeve contains an annular spring. The spring on the inner surface facilitates the removal of the corrugated tube from the nut and coupling body by forcing the segments outward upon loosening the nut.

50 Claims, 9 Drawing Sheets

SELF-SEALING PRE-ASSEMBLED ENDFITTING/COUPLING FOR CORRUGATED TUBING

CROSS REFERENCE TO RELATED APPLICATIONS

Provisional Patent Application filed May 8, 2002 Serial No. 60/378,807.

BACKGROUND OF THE INVENTION

The invention relates to a fitting for holding an end(s) of a section of corrugated tubing, whereby a seal is created. The resulting seal allows for a leak-free passage of gases and liquids.

Corrugated tubing is used in a wide variety of applications. Uses include gas lines for residential and commercial applications such as connecting a gas clothes dryer, water heater, kitchen range or central heating unit to a fuel source. Uses also include air conditioning systems, hydraulics, electrical applications, plumbing, and even medical applications such as delivering anesthesia products.

Corrugated tubing is often manufactured from metal, such as stainless steel, copper, aluminum and other metals, from plastics such as polyethylene, or a combination of metal and plastic. Additionally, corrugated tubing has ridges and grooves on its outer surface, which allow the tubing to bend.

The primary advantage of corrugated tubing is that it is flexible. Historically, rigid steel tubing was used for the transport of gases, particularly natural gas. However, rigid steel tubing is time consuming to cut, thread and tighten, and is often difficult to extend to remote locations. To bend rigid steel tubing, one must attach an elbow fitting to the straight sections of tubing. Flexible corrugated tubing, however, does not require elbow fittings and is, therefore, less expensive to install and able to reach locations that rigid tubing cannot. Further, flexible tubing has fewer locations where gases can leak than straight tubing equipped with elbow fittings. This reduces leak paths and pressure drops.

Corrugated tubing is generally attached to fuel sources, appliances, and additional sections of tubing through the use of couplings. Couplings lock the ends of the corrugated tubing restricting their movement providing a leak-free connection between the tubing and whatever the tubing is connected to. Couplings generally include a coupling body, a fastener such as a nut, and a sleeve that is received in a bore in the coupling body. A typical coupling is described in a patent to Fujiyoshi (U.S. Pat. No. 5,441,312).

One such coupling body has a threaded outer surface that receives the threaded inner surface of a nut. The coupling body also has an axial through bore into which the sleeve and tubing fits. The sleeve contains axial slits to divide the sleeve into segments. The sleeve also contains multiple ridges on its inner surface into which ridges on the outer surface of the corrugated tubing fit to secure the tubing to the sleeve. To use the coupling, first the tubing is inserted into the nut, then the sleeve is fitted over the end of the corrugated tubing so the ridges in the tubing fit into the ridges on the inner surface of the sleeve. A small portion of tubing projects from the end of the sleeve. The sleeve with the portion of tubing projecting is then inserted into the through bore of the coupling body. The nut is then threaded onto the coupling body and tightened causing the ridges on the portion of tubing projecting from the sleeve to be compressed. The compressed ridges create a seal between the end of the sleeve and the tube receiving inner seal surface of the coupling body.

The coupling described above, however, does not always create an adequate seal, as it is possible for the sleeve segments to misalign on the corrugated tubing and for the tubing to misalign on the inner seal surface of the coupling body. Furthermore, the sleeve in the above-described coupling should only be used once as it may be deformed upon tightening the nut.

Over the years, improvements have been made to couplings for corrugated tubing to make them somewhat easier to assemble and allowing one to reuse the sleeve. Another patent discloses a self-flaring, split bushing pipe coupling and hose assembly. This patent features a sleeve, or "split bushing" that is comprised of at least two separate segments.

However, to assemble and use the coupling disclosed, one must perform multiple time consuming tasks. First, one must cut the tubing at a groove between convolutions on the surface of the tubing. The coating or jacket of the tube must then be cut back to reveal two convolutions on the surface of the tube. Then the nut is slid over the tubing and the sleeve or "split bushing" is placed over the two exposed convolutions of tubing. The end of the tubing with the sleeve attached is then manually compressed by the installer and inserted into the coupling body and the nut is threaded onto the body and tightened creating a seal. This process takes approximately 10 minutes to complete in the field.

In addition to being time consuming, the assembly of the disclosed coupling may result in an inadequate seal under certain circumstances. The tube has to be manually installed into the coupling body such that the annular lip on the split bushing adequately fits into the tube corrugation. The size and shape of the split bushing rib must be manually reduced by the installer to accommodate the installation of the fitting components. If the tube corrugation is in some way misshapen, the split bushing may not fit properly and may not permit the fitting to be used; or it may allow the fitting to be used with a less accurate fit that could result in an inadequate seal.

Accordingly, there exists a need for a pre-assembled coupling that may be quickly and easily installed, that creates a strong, reliable seal that is resistant to overtorqueing and creates a strong seal with non-conforming corrugated tubing, and that may be easily reused.

BRIEF SUMMARY OF THE INVENTION

The problems discussed above are alleviated by the fitting device disclosed herein. It is the object of the present invention to provide a fitting that is pre-assembled thereby reducing installation time and reducing the potential for contaminants to infiltrate the fitting during assembly.

It is a further object of the present invention to provide a fitting that provides a consistently reliable and strong seal that is resistant to overtorqueing and repeatedly creates a tight seal with corrugated tubing.

It is a further object of the present invention to provide a fitting that can be reused without disassembly.

It is a further object of the present invention to provide a fitting in which the sleeve is fully captured in the coupling body prior to installation.

It is a further object of the present invention to provide a fitting in which the sleeve is interchangeable with different fasteners and coupling bodies.

An exemplary fitting device disclosed herein comprising a coupling body, a sleeve, and a nut. One end of the nut has a through bore that is tapered and decreases in diameter toward the end of the nut. The outer surface of the sleeve is tapered as well which facilitates the radial movement of the sleeve segments upon tightening and locking the sleeve segments into the proper position on the corrugated tubing. The coupling body contains an inner seal surface with improved geometry that effectively concentrates the sealing load over a pre-determined surface and prevents overloading of the seal surface area. Specifically, an open relief surface adjacent to the seal surface in the coupling body prevents excessive or undesired crimping to the tube, which could result in fracturing the top edge of the crimped portion of the tube. Such a fracture could initiate a leak path.

The sleeve of the present invention is divided into four separate arcuate segments; the segments feature a spring. The spring is located on the interior of the sleeve. When the nut is tightened, all the sleeve segments are uniformly compressed properly fitting the sleeve rib into the tube corrugation. This prevents the sleeve from deforming upon further tightening the nut as do other sleeves that contain axial slits through only a portion of the sleeve. This also allows one to reuse the sleeve.

The spring on the inner surface facilitates the removal of the corrugated tube from the nut and coupling body by forcing the segments outward upon loosening the nut. This outward force allows the tubing to move free from the sleeve and out of the fitting device.

Additionally, the fitting device has several staked protrusions on the surface of the coupling body which function as a stop to prevent the nut from disengaging from the coupling body.

A heavy grease or "cosmoline" as is understood in the art, is preferably not applied to the assembled fitting because the grease will inhibit the movement of the pieces of the fitting and impede the mechanical function.

DETAILED DESCRIPTION OF THE INVENTION

Figure 1:
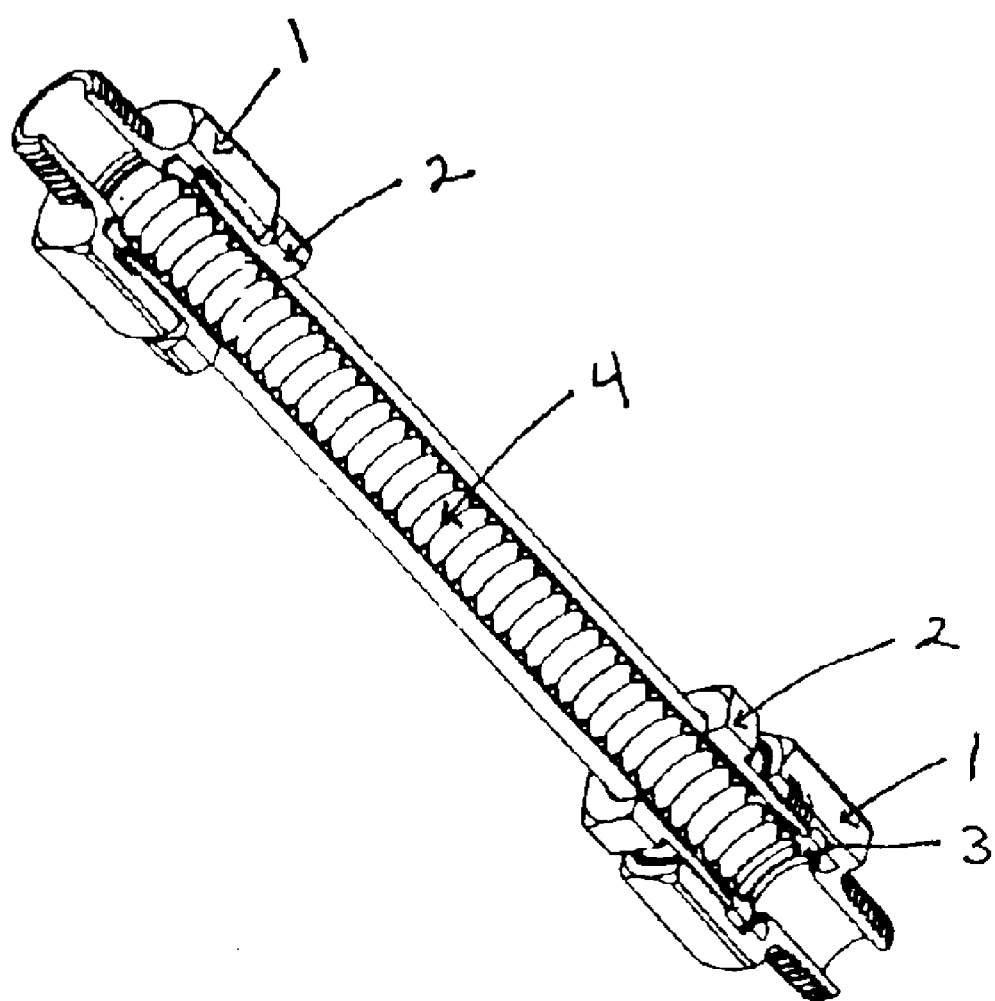
FIG. 1 is an exemplary fitting device depicting a cross-sectional view of an exemplary fitting device at each end of a corrugated tube, wherein sections of the corrugated tube are inserted into exemplary nuts and exemplary coupling bodies.
Figure 9:
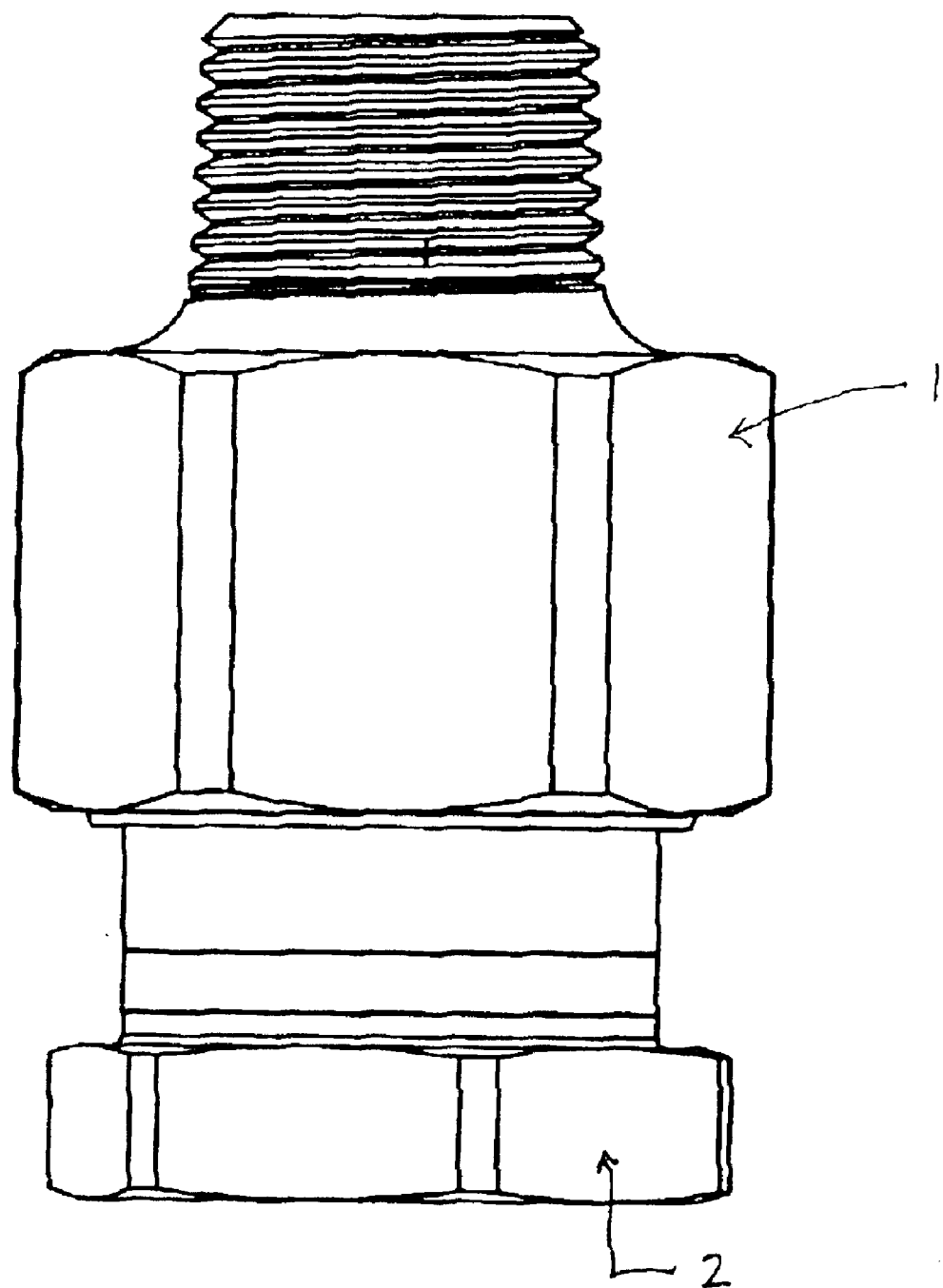
FIG. 9 is a depiction of an exemplary fitting between an exemplary coupling body and an exemplary nut.
Figure 12:
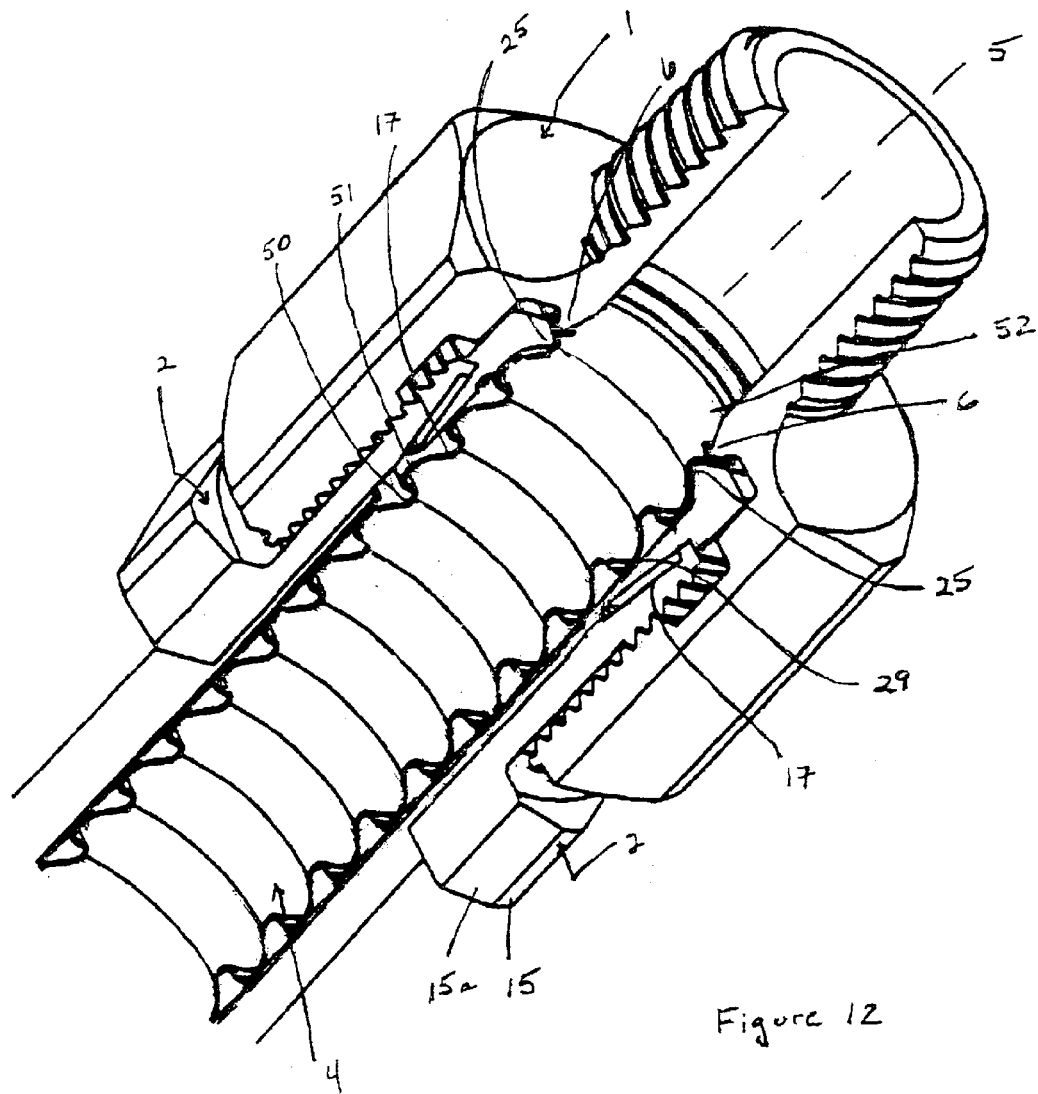
FIG. 12 is a perspective cross-sectional view of an exemplary attachment between an exemplary fitting device and an exemplary tubing.

Referring to FIG. 1, an exemplary fitting contains a coupling body 1, a nut 2, and a sleeve 3. A corrugated tubing 4 is inserted into nut 2, which contains sleeve 3. Nut 2 is threadedly engaged with coupling body 1 and tightened thereby compressing a protruding section of corrugated tubing 4, generally one full corrugation, creating a seal. In its preferred configuration and as depicted in FIGS. 1, 9 and 12, sleeve 3, nut 2, and coupling body 1 are pre-assembled into one unit 31. Preferably, the prepared end of a section of corrugated tubing 4 is inserted into the pre-assembled unit and nut 2 is tightened, thereby creating a gas-tight seal.

Figure 2:
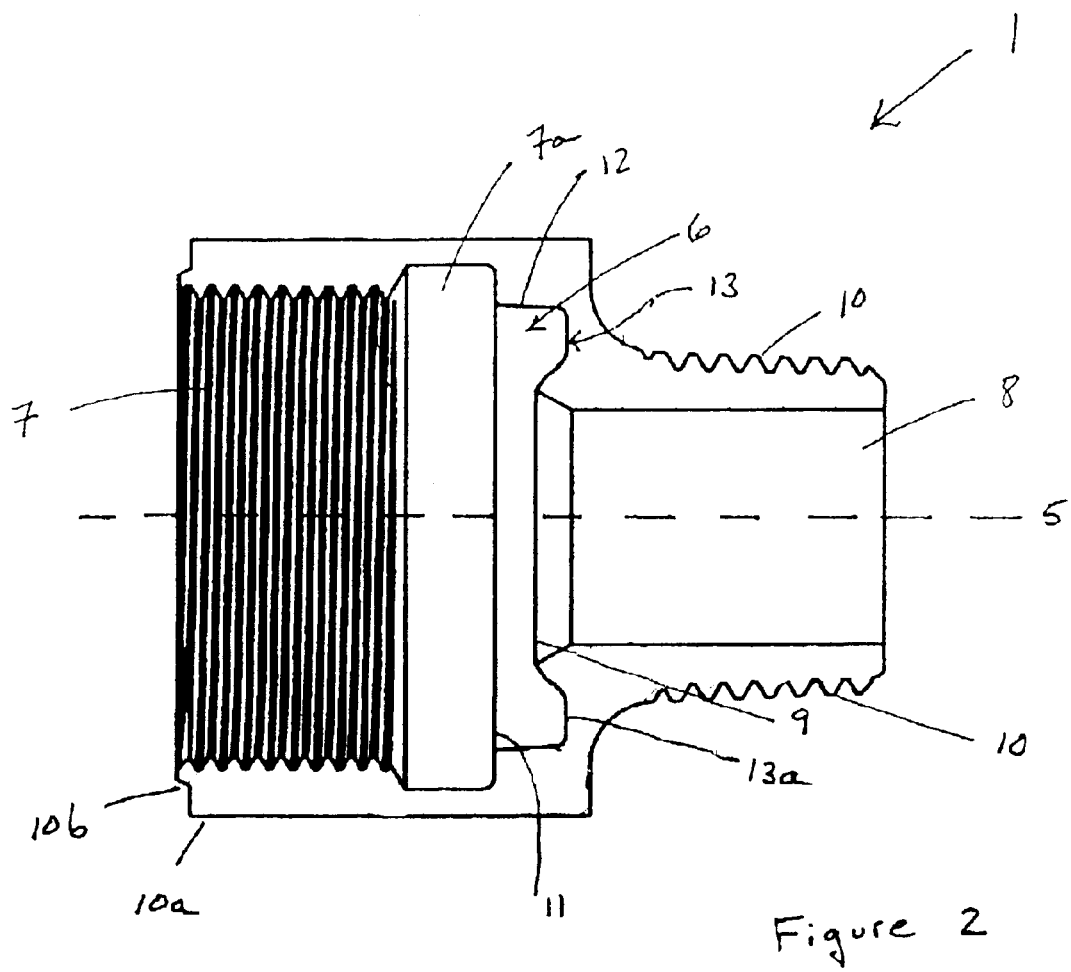
FIG. 2 is a cross-sectional view of an exemplary coupling body.

An exemplary coupling body is depicted in FIG. 2. Referring to FIG. 2, a coupling body 1 comprises an axial through bore 5 and a notched shoulder 6 that contains a sealing surface. An inner surface of through bore 5 comprises a partially threaded interior portion 7 and an unthreaded interior portion 8, which is of a smaller diameter than partially threaded interior portion 7. Notched shoulder 6 of coupling body 1 separates partially threaded interior portion 7 from unthreaded interior portion 8. Partially threaded interior portion 7 comprises an unthreaded portion 7a, which abuts notched shoulder 6. Notched shoulder 6 prevents the tubing, e.g., the corrugated tubing (not shown), from passing completely through through bore 5 of coupling body 1 and creates the seal surface. In its preferred configuration, coupling body 1 also contains a threaded exterior portion 10 to which tubing or a fitting may be attached, and a radial flange 10a preferably comprising a hexagonal flats portion.

In its preferred configuration, exterior radial flange 10a of coupling body 1 comprises an angular surface 10b for staking. Staking functions as a stop to prevent the nut from disengaging from the coupling body and evenly distributes the force on the interior threads of the coupling body when engaged with the threads of the nut. Although the number and position of the stakings may vary, in its preferred configuration, the coupling body contains one or two stakings, wherein multiple stakings are at approximately 120-degree angles from each other.

Still referring to FIG. 2, notched shoulder 6 of coupling body 1 comprises several annular surfaces. For example, a first surface 11 is approximately perpendicular to partially threaded interior portion 7 of through bore 5. First surface 11 narrows the diameter of through bore 5. A second surface 12 which is approximately perpendicular to first surface 11, and which is approximately parallel to partially threaded interior portion 7 of through bore 5. Notched shoulder 6 further comprises a third surface 13, which is parallel to first surface 11 and further narrows the diameter of through bore 5. Third surface 13 contains a flat portion 13a and an annular lip 9. Annular lip 9 preferably protrudes towards partially threaded interior portion 7 (the left side of coupling body 1 as depicted in FIG. 2). Annular lip 9 assists in creating the sealing surface and is an integral part of the sealing process. Flat portion 13a of third surface 13 functions as an open relief surface preventing excessive crimping of the tube upon overtorqueing which could result in a fracture of the tube and a leak.

Figure 3:
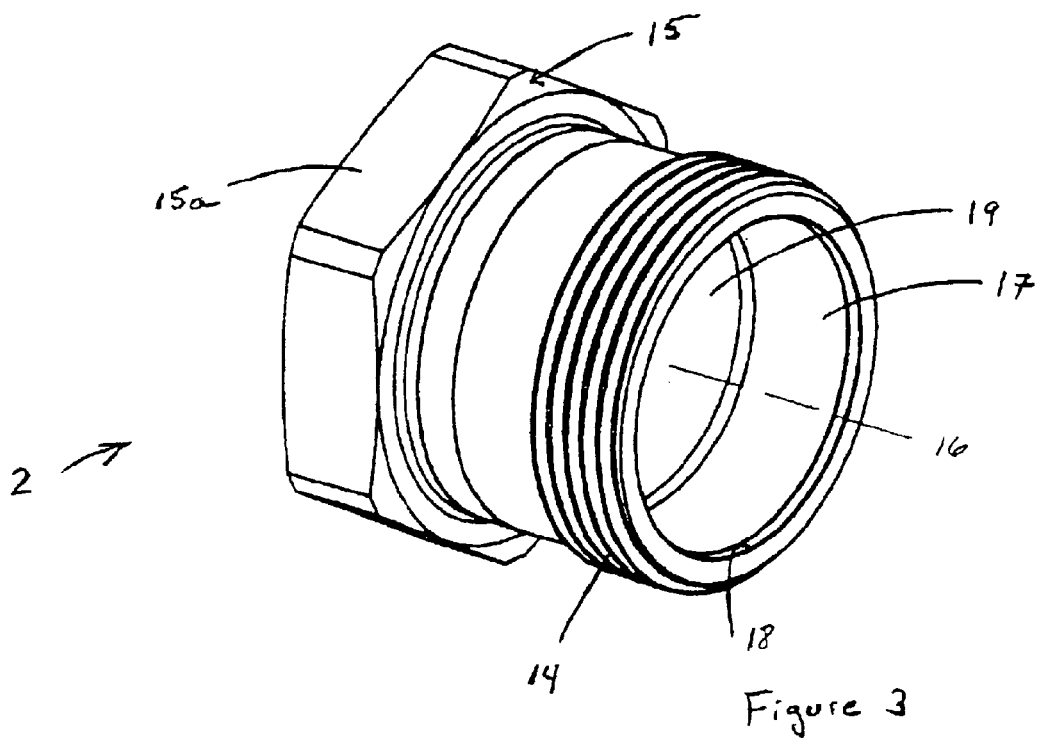
FIG. 3 is a perspective view of an exemplary nut.
Figure 4:
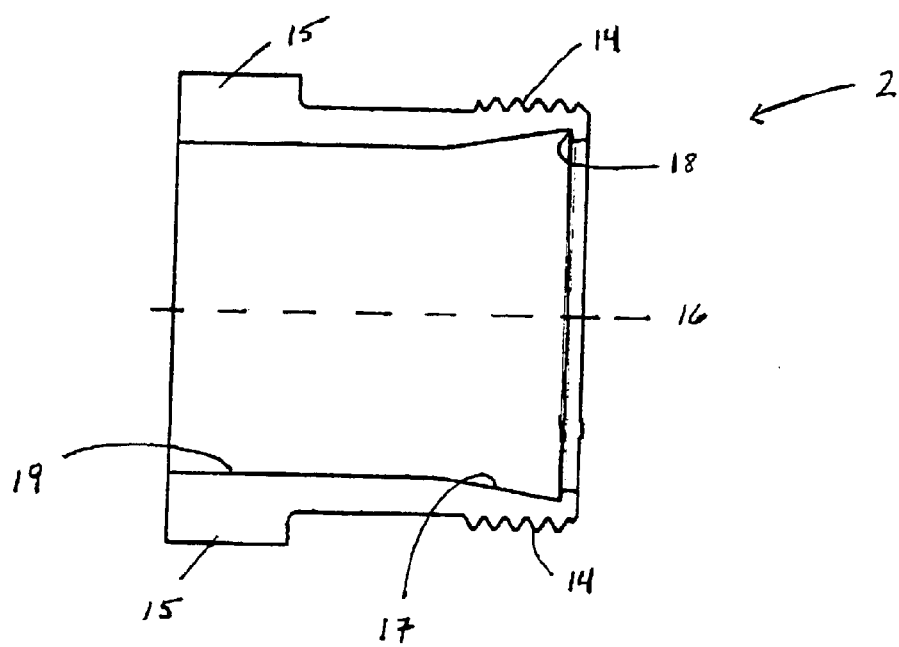
FIG. 4 is a cross-sectional view of an exemplary nut.
Figure 7:
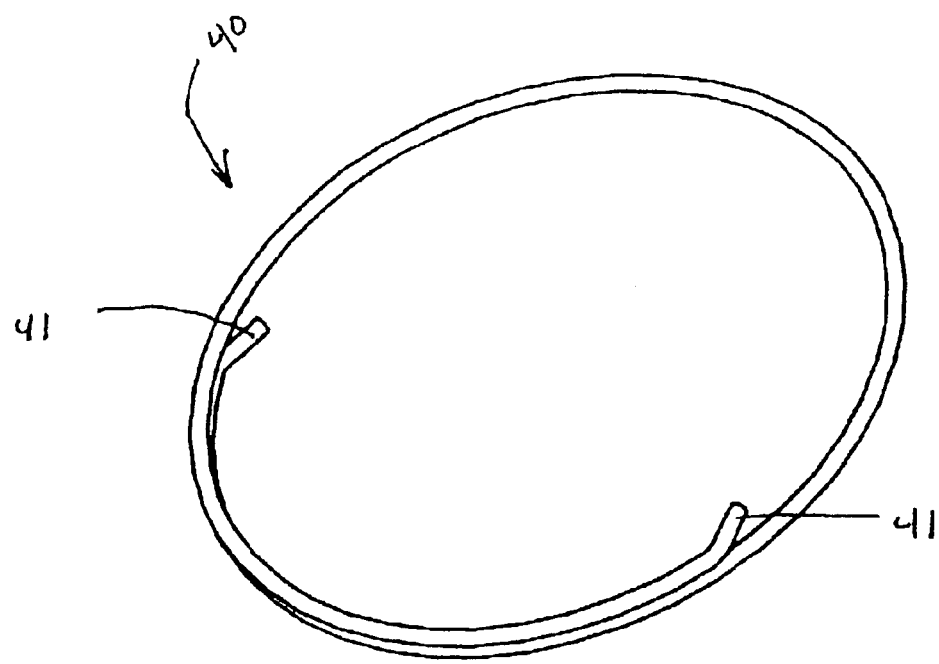
FIG. 7 is a perspective top view of an exemplary spring.
Figure 8:
FIG. 8 is a perspective side view of an exemplary spring.

An exemplary nut is depicted in FIGS. 3 and 7, wherein FIG. 4 depicts a cross-section of the nut, and FIG. 3 depicts an elevational view of the nut. Referring to FIGS. 3 and 7, a nut 2 contains a threaded exterior portion 14, referred to as the nut's threaded end, that is threadedly engageable with the internally threaded portion of the coupling body (reference numeral 7 in FIG. 1). Nut 2 also contains a radial flange 15, referred to as the nut's flange end, having a flats portion 15a that may be tightened with a wrench or other toot during installation. Preferably, flats portion 15a is hexagonal. Nut 2 contains an axial through bore 16, which receives the sleeve (not shown) and the corrugated tubing (not shown). Through bore 16 contains a tapered inner surface 17 that begins with an annular lip 18 that protrudes into through bore 16 at threaded end 14. Tapered inner surface 17 gradually narrows reducing the diameter of through bore 16 and then stops narrowing leaving a section of straight through bore 19 which continues through flange end 15. While in its preferred configuration the coupling contains a threaded nut, other fasteners may be used. Such fasteners may include, for example, a saw tooth or gear design in which teeth or gears on the exterior surface of the fastener join with gears or teeth on the interior surface of the coupling body.

Figure 6:
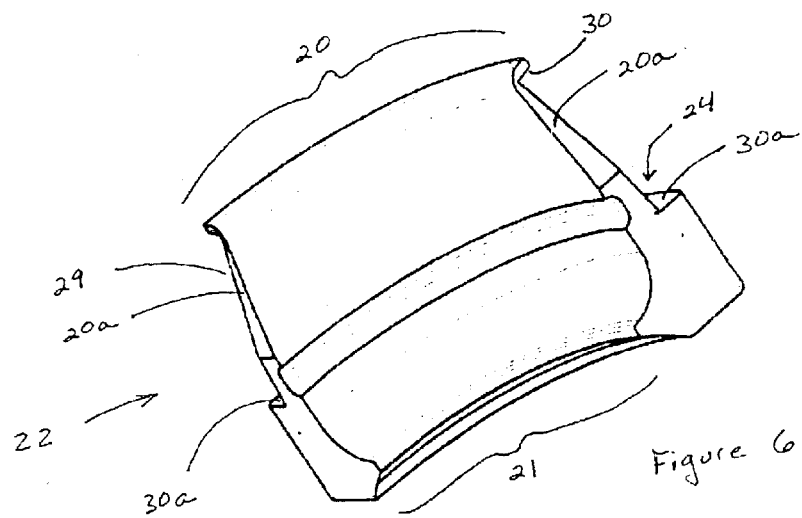
FIG. 6 is a perspective view of an exemplary segment of a sleeve.
Figure 5:
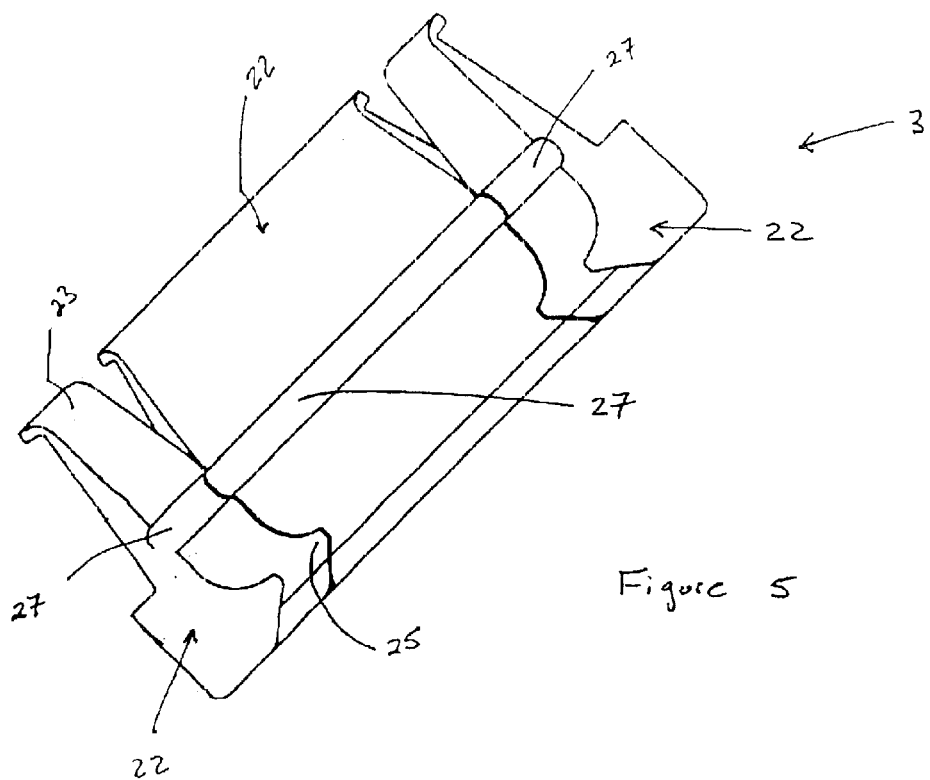
FIG. 5 is a cross-sectional view of an exemplary sleeve.

An exemplary sleeve is depicted in FIGS. 5 and 6. Referring to FIG. 5, in its preferred configuration, a sleeve 3 is comprised of four separate segments 22 (only three segments shown). While in its preferred configuration, the sleeve is divided into four segments, the sleeve may comprise more than four segments, for example up to 8 segments. The geometry of corrugated tubing, however, is such that with four sleeve segments it is easier to remove the tubing from the fitting, and the cost to manufacture the sleeve is reduced as compared to a sleeve comprised of more than four segments. Alternatively, the sleeve could be comprised of fewer than four segments.

Referring to FIGS. 5 and 6, each segment 22 contains an inner surface 23 and an outer surface 24. Inner surface 23 of each segment 22 has a projection 25. As shown in FIGS. 4 and 5, in an exemplary embodiment, when segments 22 are combined and compressed, they become annular and are of a diameter smaller than that of a corrugated tubing 4's ridges 51 but larger than tube 4's grooves 50. For example, as depicted in FIG. 12, when corrugated tubing 4 is inserted into sleeve 3, projection 25 fits into a groove 50 of corrugated tubing 4, thereby removably securing sleeve 3 to corrugated tubing 4.

Returning to FIGS. 5 and 6, inner surface 23 of each segment 22 also contains a recessed groove 27 which, when the segments are connected, becomes annular. As shown in an exemplary embodiment in FIG. 10, a spring 70 fits into recessed groove 27. Spring 70 exerts an outward force on each of segment 22.

Figure 10:
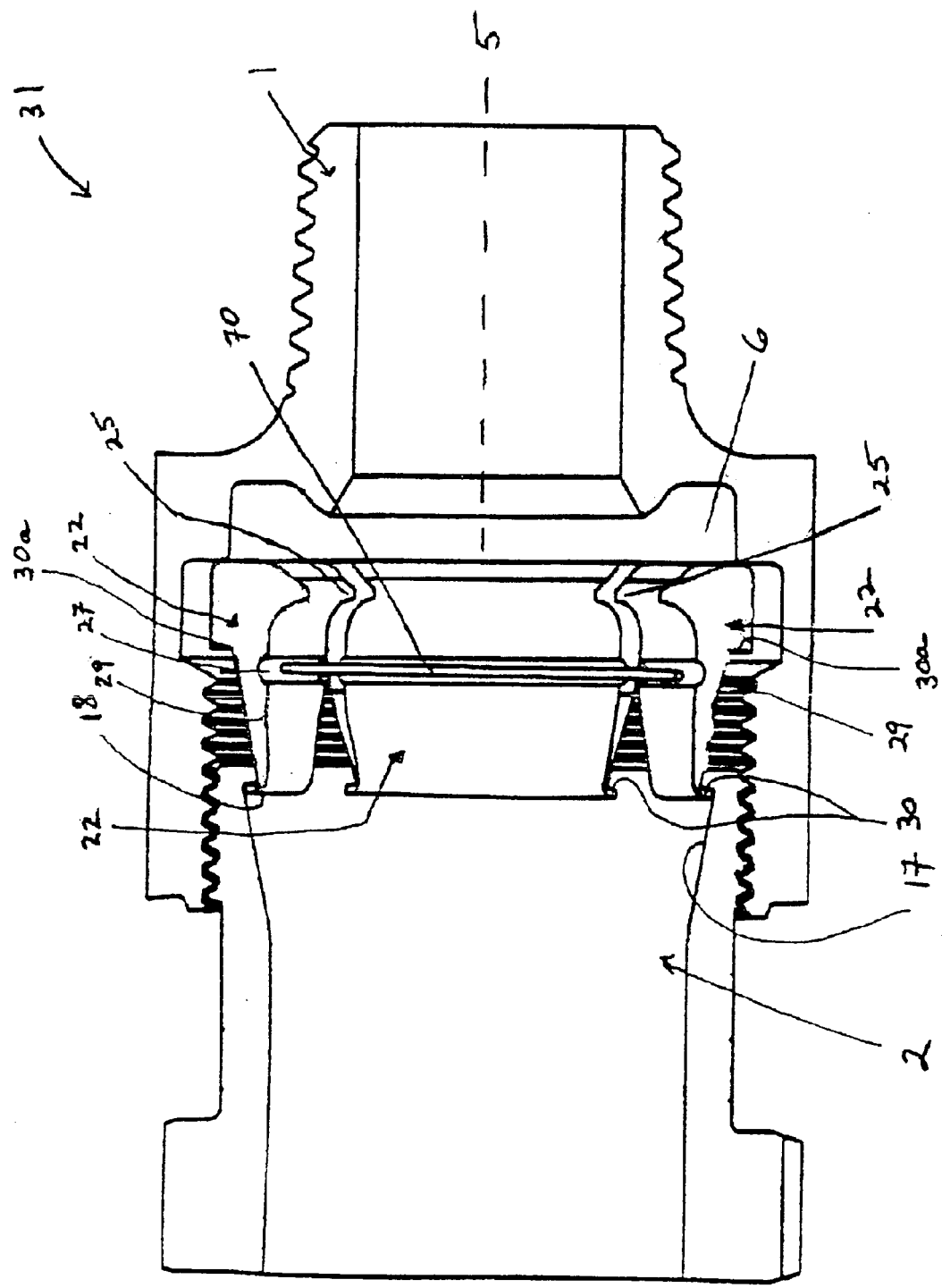
FIG. 10 is a cross-sectional view of exemplary embodiments of the coupling body, nut, and sleeve engaged with each other.
Figure 11:
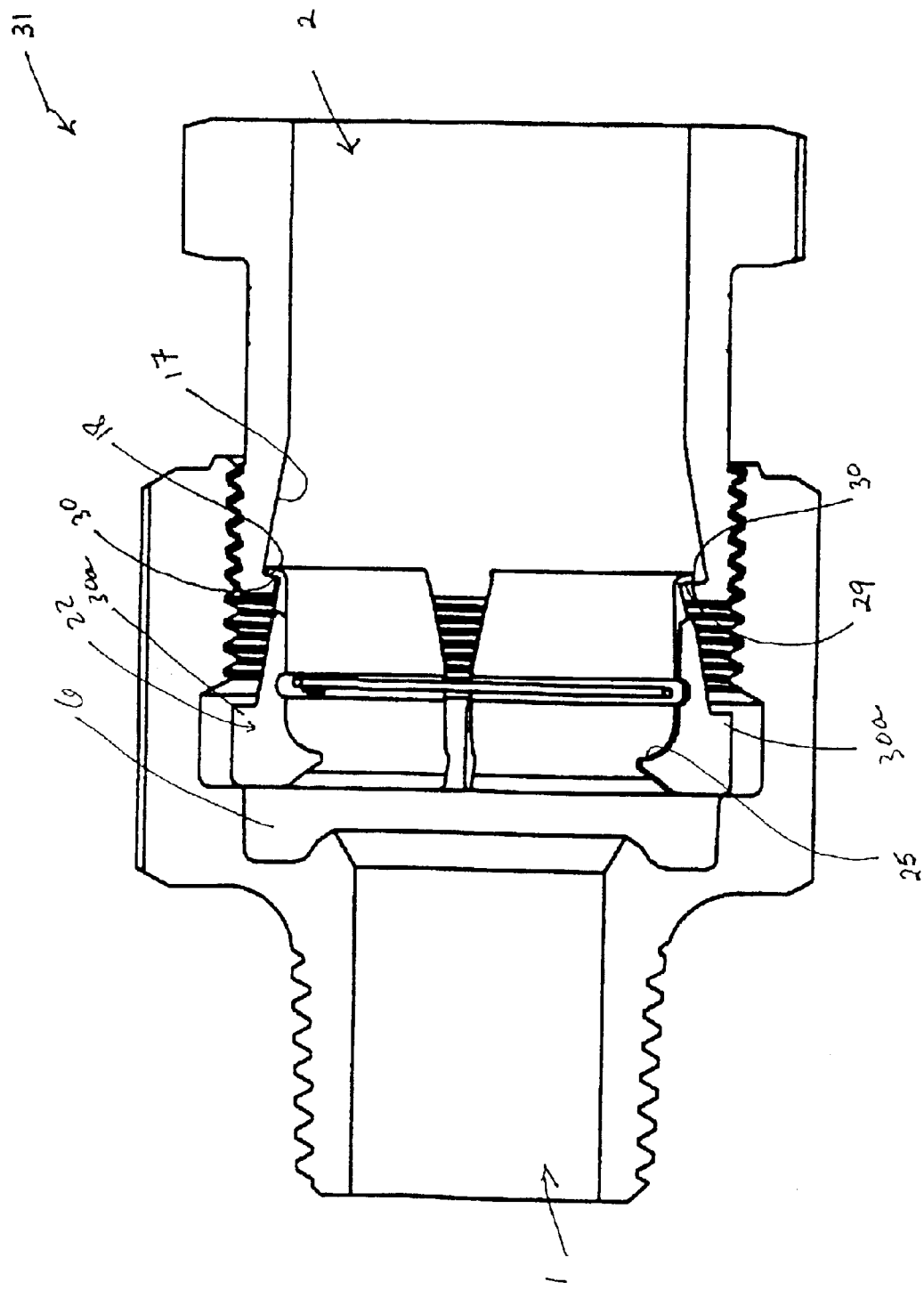
FIG. 11 is an exemplary embodiment of the fitting device particularly depicting a side view of an exemplary sleeve comprising multiple sleeve segments.

An exemplary spring is shown in FIGS. 10 and 11. Referring to FIGS. 10 and 11, in its preferred configuration the spring is an annular spring 40. The terminal ends 41 of spring 40 are bent inward toward the center of annular spring 40. Though not required, it is preferred that the terminal ends overlap each other, such as is shown in FIGS. 10 and 11. The bent ends of annular spring 40 prevent the ends from becoming lodged between the sleeve segments upon tightening the nut, preventing the fitting from functioning properly. While in its preferred configuration the ends are bent inward, the ends of the spring and the spring itself may be shaped differently.

Referring back to FIG. 6, each of segments 22 preferably comprises tapered portions 29 of their outer surfaces 24. Tapered portions 29 narrow the thickness of the sleeve gradually toward a proximal end 20 of the sleeve. Tapered portions 29 begin near a distal end 21 of segment 22 and begin with a shoulder 30a. Tapered portions 29 terminate at proximal end 20 with a protruding lip 30.

Still referring to FIG. 6, in its preferred configuration, protruding lip 30 extends along the entire length of proximal end 20 of the sleeve. However, in an alternative embodiment, at least one of the segments may comprises a rectangular void at the proximal end, such that a portion of the protruding lip is cut away thereby dividing the protruding lip into two arcuate lip portions. Preferably, the cut away portion is centered such that the arcuate lip portions are equal in width.

The tapered portion of the sleeve's outer surface (e.g., reference numeral 29 in FIG. 6) corresponds to the tapered interior surface of the nut (e.g., reference numeral 17 in FIG. 4), thereby, facilitating radial movement of the sleeve segments, locking them into the proper position in the tube's groove when the nut is tightened. The tapered surfaces of the nut and sleeve form an approximately supplementary angle when the surfaces are brought into contact with one another.

In its preferred configuration, and as depicted in FIG. 6, each of segments 22 also has tapered sides 20a. Tapered sides 20a begin to taper at shoulder 30a and cease tapering at protruding lip 30. In its preferred configuration, the sides taper at an angle of approximately 10 degrees relative to proximal end 20 of segment 22. The purpose of tapered sides 20a is to prevent overlap of the sleeve segments when the tubing is not in the fitting.

In its preferred configuration the sleeve is manufactured from stainless steel for strength and to resist corrosion. The sleeve may also be manufactured from brass or any other material that has suitable strength and corrosive properties. Preferably, the sleeve is plated with silver to decrease friction and increase lubricity. Preferably, the silver plating is done as a last step in the manufacturing process. The sleeve may also be coated with a suitable lubricant such as a dry film type lubricant. Lubrication prevents seizing or galling of contacting materials under load.

The fitting is formed by combining a body, a nut, and a sleeve, such as those is described herein. For example, the threaded exterior portion of the nut (reference numeral 14 in FIG. 4) may be engaged with the partially threaded interior portion of the coupling body (reference numeral 7 in FIG. 2) to achieve an exemplary fitting as disclosed in FIG. 9. Here then, a surface view of a single fitting unit 31 comprises nut 2 joined to coupling body 1 such that an interior portion of the distal end of nut 2 is disposed within a portion of coupling body 1.

Referring to FIGS. 6 and 9, each segment 22 forming the sleeve preferably comprises a proximal end 20 that receives corrugated tubing 4, and a distal end 21 which is inserted into nut 2 and coupling body 3. Referring to FIG. 9, an exemplary fitting comprises a distal end of nut 2 inserted into coupling body 1.

Referring to FIGS. 4, 9, and 12, upon further tightening nut 2, tapered inner surface 17 of nut 2 contacts and moves about tapered outer surface 29 of the sleeve creating a wedging action forcing nut 2 and the sleeve toward notched shoulder 6 of coupling body 1. As shown in FIG. 10, shoulder 30a of the sleeve prevents tapered inner surface 17 of nut 2 from sliding over tapered surface 29 of the sleeve and facilitates the movement of the sleeve toward notched shoulder 6 of coupling body 1 creating the seal. This is principally accomplished by shoulder 30a of the sleeve coming into contact with annular lip 18 of nut 2. Similarly, protruding lip 30 on tapered portion 29 of the sleeve prevents nut 2 from completely detaching from the sleeve upon loosening of nut 2. This is primarily accomplished by protruding lip 30 of the sleeve coming into contact with annular lip 18 on tapered inner surface 17 of nut 2.

Tapered surfaces 17, 29 of the sleeve and nut 2 respectively create a wedging action when nut 2 is tightened. This has the effect of compressing all four segments 22 of the sleeve and forcing nut 2 and the sleeve further into axial through bore 5 of coupling body 1 toward notched shoulder 6 of coupling body 1 until projection 25 and corrugated tubing (not shown) contact notched shoulder 6.

In its preferred configuration and as depicted in FIGS. 1 and 4, sleeve 3, nut 2, and coupling body 1 are pre-assembled into a single fitting 31. To use the fitting in its preferred embodiment, a corrugated tubing 4 is inserted into the pre-assembled fitting 31 through a proximal end of nut 2. Nut 2 is then tightened.

However, as a preliminary step, the corrugated tubing is preferably prepared for insertion. This may be accomplished by removing the outer coating or jacket of the tube to expose three or four corrugations. The tube end may then be cut to provide as clean a cut as possible.

FIG. 12 depicts an exemplary placement of the corrugated tubing into a fitting. Referring to FIGS. 4, 6, and 9, a corrugated tubing 4 is inserted into proximal end 20 of the sleeve, wherein the sleeve is contained within coupling body 1. Projections 25 on the respective inner surfaces of the annular sleeve fit into grooves 50 in corrugated tubing 4. A portion of tubing 52, generally one full corrugation, protrudes from the end of the sleeve within coupling body 1.

As torque is applied to the flats portion of nut 2's radial flange 15, tapered inner surface 17 of nut 2 slides over the complementary tapered portion 29 of sleeve 3. This has the effect of compressing all segments 22 of sleeve 3 and forcing nut 2 and sleeve 3 further into axial through bore 5 of coupling body 1 toward notched shoulder 6 of coupling body 1 until the sleeves' projections 25 and corrugated tubing 4 contact notched shoulder 6. The compression of segments 22 causes the portion of corrugated tubing 52 protruding from sleeve 3 to be compressed against notched shoulder 6 of coupling body 1.

Referring to FIGS. 2, 4, 6, and 9, portion of tubing 52 is compressed against second 12 and third surfaces 13 and annular lip 9 of notched shoulder 6 of coupling body 1 creating a tight seal. Projection 25 of the sleeve may be shaped to fit within second 12 and third 13 surfaces of notched shoulder 6 of the coupling body 1 thereby effectively concentrating the sealing load and assuring a reliable tight seal.

To remove the coupling, torque is applied to flats portion 15a of nut 2's radial flange 15, thereby loosening nut 2. Loosening nut 2 causes tapered inner portion 17 of nut 2 to slide over the complementary tapered portion 29 of the sleeve allowing inner spring 70 to expand and exert an outward force on segments 22. Corrugated tubing 4 may then be removed. Segments 22 will return to their pre-sealing state, as they do not deform in the sealing process as do conventional sleeves. The fitting may then be reused.

Additionally, in its preferred configuration, the fitting comprises a removable plastic end plug. The end plug assures that the fitting is kept clean and devoid of contaminants, and is ready for installation of the tubing upon removal of the plug.

Other less effective variations on the inventive fitting are possible. These include variations in which the body containing the seal surface is configured such that a fastener may fit over the body, as opposed to into the body, pushing the sleeve toward the shoulder until it has compressed a section of corrugated tubing against the shoulder. Additionally, in configurations such as this the fastener may be fastened to the body through the use of a sawtooth or gear design in which teeth or gears on the interior surface of the fastener join with gears or teeth on the exterior surface of the body. The functionality of a configuration such as this is reduced as the fastener may not be easily detached from the body.

The fitting device disclosed herein provides several advantages over the prior art. For example, the fitting device disclosed herein, the sleeve-does not need to be manually compressed/reduced to fit into the coupling body as the coupling components are pre-assembled. To use the inventive fitting, one must simply insert the prepared end of the tubing into the fitting device and then tighten the nut. Should there be a variation in the tube corrugation, there is sufficient radial force created by the wedging action between the nut and sleeve when the nut is tightened to force the rib on the sleeve segments into the tube corrugation.

Although the invention has been shown and described with respect to its preferred embodiment, those skilled in the art should understand that the foregoing and various other changes, omissions, and additions in the form and detail may be made without departing from the spirit and scope of the invention.

What is claimed is:

1. A fitting for connecting corrugated tubing, wherein the fitting comprises:
   a coupling body comprising an axial body through bore, wherein the axial body through bore comprises:
      a first portion having a diameter;
      a second portion having a reduced diameter, and
      a shoulder portion between the first portion and the second portion that abuttingly receives the tubing;
   a nut which may be removably attached to the coupling body, wherein the nut comprises an axial nut through bore, wherein the axial nut through bore comprises:
      a tapered inner surface; and
   a sleeve which is received in the axial nut through bore such that the tapered inner surface of the nut gradually reduces an interior diameter of the sleeve, and further wherein the sleeve comprises a plurality of separate arcuate segments, each segment comprising:
      an inner surface comprising:
         a projection at a first end of the segment such that when the segments are assembled together the projections form a continuous annular projection;
         an inner groove which, when the segments are assembled together, becomes annular and continuous, the inner groove containing an annular inner spring; and
      an outer surface comprising:
         a tapered portion, wherein the tapered portion gradually narrows decreasing the inside diameter of the sleeve until the sleeve terminates at a second end.

2. The fitting of claim 1, wherein the shoulder portion of the coupling body comprises:
   a first surface that narrows the diameter of the first portion of the body through bore;
   a second surface; and
   a third surface that further narrows the diameter of the first portion of the body through bore, wherein the third surface comprises:
      a flat portion disposed at each end of an annular lip;
   wherein the second surface is disposed perpendicularly between the first and third surfaces.

3. The fitting of claim 2, wherein the first surface is approximately perpendicular to the first portion of the coupling body through bore, the second surface is approximately perpendicular to the first surface, the flat portions of the third surface are approximately perpendicular to the second surface, and the annular lip projects towards the first portion of the coupling body through bore.

4. The fitting of claim 1, wherein:
the first portion of the coupling body through bore comprises a threaded surface; and
the nut comprises a threaded exterior portion threadedly engageable with at least a portion of the threaded surface of the first portion of the body through bore.

5. The fitting of claim 4, wherein the first portion of the coupling body through bore further comprises an unthreaded portion that abuts the shoulder portion of the coupling body through bore.

6. The fitting of claim 4, wherein the nut further comprises an exterior flats portion, wherein the exterior flats portion of the nut may be adjusted to move the flats portion of the nut toward the coupling body when the threaded exterior portion of the nut is threadedly engaged with the first portion of the coupling body.

7. The fitting of claim 6, wherein the tapered inner surface of the axial nut through bore comprises a widest point located at an end of the nut closest to the threaded exterior portion, and wherein the tapered inner surface gradually narrows, and then stops narrowing leaving a straight section of nut through bore, wherein the straight section terminates at the end of the nut containing the flats portion, and further wherein a nut annular lip is disposed at the widest point.

8. The fitting of claim 7, wherein the outer surface of the sleeve segments further comprises:
an untapered portion; and
a shoulder element;
wherein the tapered portion begins at a side of the shoulder element opposite to the untapered portion, then gradually narrows until it reaches its narrowest point where it terminates with a sleeve lip.

9. The fitting of claim 8, wherein the shoulder elements of the sleeve segments contact the annular lip of the nut through bore when the tapered inner surfaces of the nut are in contact with the tapered portions of the sleeve segments.

10. The fitting of claim 7, wherein at least one of the sleeve segments comprises a void at the narrowest end of the segment terminating with the sleeve lip such that the sleeve lip is divided into at least one arcuate sleeve lip portion.

11. The fitting of claim 1, wherein the coupling body further comprises an exterior surface comprising an exterior flats portion on a side of the coupling body opposite to a threaded exterior portion.

12. The fitting of claim 1 in which the first portion of the coupling body through bore further comprises a plurality of protrusions.

13. The fitting of claim 12, wherein the plurality of protrusions comprises a staked protrusion(s).

14. The fitting of claim 1, wherein the plurality of separate arcuate segments comprises four individual segments.

15. The fitting of claim 1, wherein the annular inner spring comprises two overlapping terminal ends which are directed inwardly towards a center of the annular spring.

16. The fitting of claim 1, wherein the plurality of sleeve segments further comprises sides that are cut away such that each segment has a wide end which gradually tapers to a narrower end.

17. The fitting of claim 1, wherein the tapered portion of the sleeve segments is tapered such that it forms an approximately supplementary angle to the tapered inner surface of the axial nut through bore when the tapered portions of the sleeve and the nut are brought into contact with each other.

18. The fitting of claim 1, wherein at least one of the sleeve, nut, and coupling body are manufactured from a metal or metal alloy material selected from the group consisting of stainless steel, brass, copper, titanium, carbon steel, nickel alloy or blends thereof.

19. The fitting of claim 1, wherein the sleeve is plated with silver.

20. The fitting of claim 1, wherein the sleeve is coated with a dry film lubricant.

21. A fitting for connecting corrugated tubing, wherein the fitting comprises:
a coupling body having an axial body through bore, wherein the axial body through bore comprises:
a first portion comprising a diameter;
a second portion comprising a reduced diameter, and
a shoulder portion disposed between the first portion and the second portion that abuttingly receives the tubing, wherein the shoulder portion of the coupling body comprises:
a first surface that narrows the diameter of the first portion, and which is approximately perpendicular to the first portion;
a second surface, wherein the second surface is approximately perpendicular to the first surface; and
a third surface that further narrows the diameter of the first portion, wherein the third surface comprises:
a flat portion, wherein the flat portion is approximately perpendicular to the second surface; and
an annular lip, wherein the annular lip protrudes towards the first portion;
a nut which may be removably attached to the coupling body, wherein the nut comprises an axial nut through bore, wherein the axial nut through bore comprises:
a tapered inner surface, wherein the tapered inner surface gradually reduces an interior diameter of the nut through bore; and
an annular lip; and
a sleeve which is received in the axial through bore of the nut, wherein the sleeve comprises a plurality of separate arcuate sleeve segments, each sleeve segment comprising:
an inner surface comprising:
a projection at a first end of the segment such that when the segments are joined together by an annular spring, the projections form a continuous annular projection; and
an inner groove, which, when the sleeve segments are joined together by the annular spring, becomes annular and continuous; an outer surface, wherein the outer surface comprises:
a tapered portion, wherein the tapered portion gradually narrows, thereby decreasing the thickness of each sleeve segment until the segment terminates at a second end; and
at least two sides, wherein at least one of each side is cut away such that each sleeve segment has a wide end which gradually tapers to a narrower end, wherein the tapered portion of the side is tapered such that it forms an approximately supplementary angle to the tapered inner surface of the nut when the tapered sides of the sleeve and the tapered inner surface of the nut are brought into contact with each other.

22. The fitting of claim 21, wherein:
the first portion of the coupling body through bore comprises a threaded surface; and
the nut comprises a threaded exterior portion that is threadedly engageable with at least a portion of the threaded surface of the first portion of the coupling body through bore.

23. The fitting of claim 22, wherein the first portion of the coupling body through bore further comprises an unthreaded portion that abuts the shoulder portion of the coupling body through bore.

24. The fitting of claim 22, wherein the nut further comprises an exterior flats portion, wherein the exterior flats portion of the nut may be adjusted to move the flats portion of the nut towards the coupling body when the threaded exterior portion of the nut is threadedly engaged with the first portion of the coupling body.

25. The fitting of claim 24, wherein the tapered inner surface of the axial nut through bore comprises a widest point located at an end of the nut closest to the threaded exterior portion, and wherein the tapered inner surface gradually narrows, and then stops narrowing leaving a straight section of nut through bore, wherein the straight section terminates at the end of the nut containing the flats portion, and further wherein a nut annular lip is disposed at the widest point.

26. The fitting of claim 21, wherein the coupling body further comprises an exterior flats portion on a side of the coupling body opposite to a threaded exterior portion.

27. The fitting of claim 21, wherein the first portion of the coupling body through bore further comprises a plurality of protrusions.

28. The fitting of claim 27, wherein the tapered inner surface of the axial nut through bore comprises a widest point located at an end of the nut closest to the threaded exterior portion, and wherein the tapered inner surface gradually narrows, and then stops narrowing leaving a straight section of nut through bore, wherein the straight section terminates at the end of the nut containing the flats portion, and further wherein a nut annular lip is disposed at the widest point.

29. The fitting of claim 28, wherein the outer surface of the sleeve segments further comprises:
an untapered portion; and
a shoulder element;
wherein the tapered portion begins at a side of the shoulder element opposite to the untapered portion, then gradually narrows until it reaches its narrowest point where it terminates with a sleeve lip.

30. The fitting of claim 29, wherein the shoulder elements of the sleeve segments contact the annular lip of the nut through bore when the tapered inner surfaces of the nut are in contact with the tapered portions of the sleeve segments.

31. The fitting of claim 28, wherein at least one of the sleeve segments comprises a void at the narrowest end of the segment terminating with the sleeve lip such that the sleeve lip is divided into at least one arcuate sleeve lip portion.

32. The fitting of claim 27, wherein the plurality of protrusions comprises a staked protrusion(s).

33. The fitting of claim 21, wherein the plurality of separate arcuate segments comprises four individual segments.

34. The fitting of claim 21, wherein the annular inner spring further comprises two overlapping terminal ends which are directed inwardly towards a center of the annular spring.

35. The fitting of claim 21, wherein at least one of the sleeve, the nut, and the coupling body are manufactured from a metal or metal alloy material selected from the group consisting of stainless steel, brass, copper, titanium, carbon steel, nickel alloy or blends thereof.

36. The fitting of claim 21, wherein the sleeve is plated with silver.

37. The fitting of claim 21, wherein the sleeve is coated with a dry film lubricant.

38. A fitting for connecting corrugated tubing, wherein the fitting comprises:
a coupling body comprising an axial body through bore, wherein the axial body through bore comprises:
a first portion of the coupling body through bore comprising a diameter and a threaded surface;
a second portion comprising a reduced diameter and an unthreaded surface; and
a shoulder portion between the first portion and the second portion that abuttingly receives the tubing, wherein tile shoulder portion comprises:
a first surface that narrows the diameter of the first portion of the coupling body through bore, and which is approximately perpendicular to the first portion;
a second surface, wherein the second surface is approximately perpendicular to the first surface; and
a third surface that further narrows the diameter of the first portion, wherein the third surface comprises:
a flat portion, wherein the flat portion is approximately perpendicular to the second surface; and
an annular lip, wherein the annular lip protrudes towards the first portion of the coupling body through bore;
a nut which may be removably attached to the coupling body, wherein the nut comprises an axial nut through bore, wherein the axial nut through bore comprises;
a tapered inner surface, wherein the tapered inner surface comprising a widest point located at an end of the nut closest to the threaded exterior portion, and wherein the tapered inner surface gradually narrows, and then stops narrowing leaving a straight section of nut through bore, wherein the straight section terminates at the end of the nut containing a flats portion;
a threaded exterior portion, wherein the threaded exterior portion is threadedly engageable with the threaded surface of the first portion of the body through bore;
the exterior flats portion, wherein the exterior flats portion may be adjusted to move the exterior flats portion towards the coupling body when the threaded exterior portion of the nut is threadedly engaged with the first portion of the coupling body; and
an annular lip at a widest point of the tapered inner surface of the nut, wherein the annular lip is located at an end of the nut containing the threaded exterior portion; and
a sleeve which is received in the axial through bore of the nut, wherein the sleeve comprises a plurality of separate arcuate sleeve segments, each sleeve segment comprising:
an inner surface comprising:
a projection at a first end of the segment such that when the segments are joined together by an annular spring, the projections form a continuous annular projection; and
an inner groove, which, when the sleeve segments are joined together by the annular spring, becomes annular and continuous; and an outer surface comprising:
a tapered portion, wherein the tapered portion of the outer surface of the segment gradually narrows decreasing the thickness of each sleeve segment until the segment terminates at a second end;

an untapered portion;
a shoulder; and
a sleeve lip
  wherein the tapered portion begins at the shoulder, and gradually narrows until it reaches its narrowest point at the second end of the sleeve segment where it terminates with the sleeve lip; and further wherein the shoulder contacts the annular lip of the nut through bore when the tapered portion of the outer surface of the segment is in contact with the tapered inner surface of the nut thereby preventing the tapered inner surface of the nut from overlapping the sleeve.

39. The fitting of claim 38, wherein the first portion of the coupling body through bore further comprises a threaded portion and an unthreaded portion, wherein the unthreaded portion abuts the shoulder portion of the coupling body through bore.

40. The fitting of claim 38, wherein nut further comprises an exterior flats portion.

41. The fitting of claim 38, wherein the first portion of the coupling body through bore further comprises a plurality of protrusions.

42. The fitting of claim 41, wherein at least one of the protrusions forming the plurality comprises a staked protrusion.

43. The fitting of claim 34, wherein the sleeve comprises four arcuate sleeve segments.

44. The fitting of claim 38, wherein the annular inner spring comprises two overlapping terminal ends, wherein the two overlapping ends are directed inwardly toward a center of the annular spring.

45. The fitting of claim 38, wherein at least one of the segments forming the plurality of segments further comprises a side(s), wherein the side(s) is cut away such that each segment comprises a wide end which gradually tapers to a narrower end.

46. The fitting of claim 38, wherein at least one of segments forming the plurality of segments comprises a void at a second end of the segment such that the sleeve lip is divided into at least one arcuate sleeve lip portion.

47. The fitting of claim 38, wherein at least one of the sleeve, the nut, and the coupling body are manufactured from a metal or metal alloy material selected from the group consisting of stainless steel, brass, copper, titanium, carbon steel, nickel alloy or blends thereof.

48. The fitting of claim 38, wherein the sleeve is plated with silver.

49. The fitting of claim 38, wherein the sleeve is coated with a dry film lubricant.

50. A method for forming a clamped tubing, wherein the method comprises:
  inserting a tubing into a fitting device wherein the fitting device comprises:
    a coupling body comprising an axial body through bore, wherein the axial body through bore comprises:
      a first portion having a diameter;
      a second portion having a reduced diameter, and
      a shoulder portion between the first portion and the second portion;
    a nut, wherein the nut comprises an axial nut through bore, wherein the axial nut through bore comprises:
      a tapered inner surface; and
    a sleeve which is received in the axial nut through bore such that the tapered inner surface of the nut gradually reduces an interior diameter of the sleeve;
  inserting an end of the tubing through a proximal end of the nut wherein the proximal end is on a side of the nut opposite to the coupling body; and
  tightening the nut such that the nut and the sleeve move through the axial through bore of the coupling body toward the shoulder of the coupling body.

\* \* \* \* \*